(No Model.)

C. BAKER.

SAW SET.

No. 479,239. Patented July 19, 1892.

Witnesses

B. S. Ober

D. P. Wolhaupter.

Inventor

Clark Baker.

By his Attorneys,

C. A. Snow & Co.

THE NORRIS PETERS CO., PHOTO-LITHO., WASHINGTON, D. C.

UNITED STATES PATENT OFFICE.

CLARK BAKER, OF GREENVILLE, OHIO.

SAW-SET.

SPECIFICATION forming part of Letters Patent No. 479,239, dated July 19, 1892.

Application filed April 22, 1892. Serial No. 430,246. (No model.)

*To all whom it may concern:*

Be it known that I, CLARK BAKER, a citizen of the United States, residing at Greenville, in the county of Darke and State of Ohio, have invented a new and useful Saw-Set, of which the following is a specification.

This invention relates to saw-sets; and it has for its object to provide certain improvements in devices of this character which will render the same much more durable and effective in operation.

With these and many other objects in view, which will readily appear as the nature of the invention is better understood, the same consists in the novel construction, combination, and arrangement of parts hereinafter more fully described, illustrated, and claimed.

Figure 3:
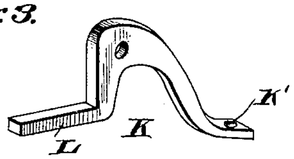
Figure 1:
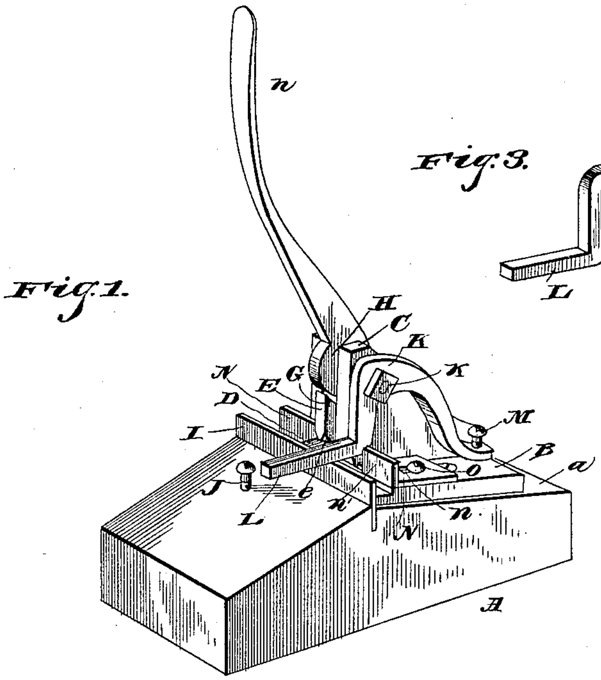
Figure 2:
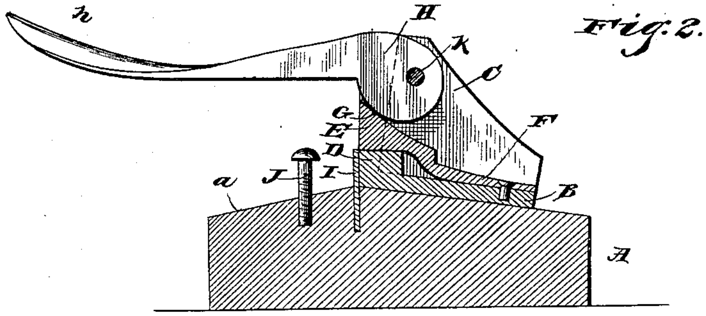

In the accompanying drawings, Figure 1 is a perspective view of a saw-set constructed in accordance with this invention. Fig. 2 is a longitudinal vertical sectional view of the same. Fig. 3 is a detail in perspective of the adjustable retaining-lever.

Referring to the accompanying drawings, A represents a suitable base, having the opposite bevel-faces *a*, to one of which is securely fastened the base-plate B. The plate B forms the base-plate of the set and is provided with the central upwardly-extending jaws C. Located upon the base-plate B between and extending in advance of the opposite jaws C is the set-anvil D, over and upon which works the spring-die E. The said die E has the usual bevel end *e*, working directly above the anvil D to press the saw-tooth thereupon to give the requisite degree of set. Said die E is further provided with the rearwardly-extending spring-shank F, secured at one end between the jaws C and serving to normally hold the die above the anvil, while the portion of said die directly over the anvil is provided with a curved bearing-edge G, in which works the eccentric lever-head H, pivotally mounted between said jaws over the die and controlled by the lever-handle *h*, which, when the saw is in position, forces the die down upon the teeth, as will be readily apparent.

Located directly in front of the base-plate and the front anvil is the transverse saw-rest plate I, upon which the teeth of the saw are designed to rest while being operated upon by the die, while the desired degree of set is given to the saw by means of the gage-screw J, arising from the opposite beveled face of the base A and taken under the body of the saw. It will be readily seen that the saw is supported by and is given the desired pitch or incline by means of the gage-screw J, while the teeth rest along the edge of the rest-plate I in position for setting upon the anvil, and the said saw is held in such position truly upon the rest, so that as the same is slid therealong the setting will be even by means of the retaining-lever K. The said retaining-lever K is pivoted centrally upon the pivot-bolt *k*, pivoting the eccentric head between the opposite jaws, and is provided with the forwardly-extending retaining-arm L, which lies directly over the rest-plate I upon one side of the gage-screw, while the other end of the lever is provided with a threaded perforation *k'*, which receives the adjusting-screw M, bearing upon the base-plate B. It will be readily seen that by adjusting-screw M the retaining-arm of the lever can be adjusted close upon and parallel with the incline of the saw-body, and thus provide means for aiding in holding the saw in its true inclined or flat position upon the gage-screw and rest-plate I.

Adjustably secured to the top face of the base-plate B on each side of the jaws thereon are the opposite gage-plates N. The said gage-plates N are provided with the longitudinally-disposed slots *n* and the stop-flanges *n'*, which are adjusted back of the rest-plate I, so as to regulate the degree of the projection of the saw-teeth between the die and the anvil, so that the length of the set is regulated. Adjusting-screws O engage the slots of said plates and the base-plate for properly adjusting the gage-plates with respect to the saw-rest plate.

The operation of the set is apparent. Having regulated the gage-screws and gage-plates and the retaining-lever, all that is necessary is to slide the saw-teeth between the anvil and the die, so that each tooth may be brought successively under the action of the die to give the same the requisite set. The many advantages of the set are also thought to be apparent without further description.

Having thus described my invention, what I claim, and desire to secure by Letters Patent, is—

1. In a saw-set, the oppositely-beveled base, a base-plate secured to one face of said base and provided with an anvil, a die working over the anvil and provided with a spring-shank secured to the base and normally holding the die above the anvil, a lever having an eccentric head pivotally mounted upon said base and working over said die, a transverse saw-rest secured to the base in front of the base-plate and the anvil thereon, a gage-screw adjustably working in the opposite face of said base, and adjustable gage-plates mounted upon opposite sides of said base-plate adjacent to the saw-rest, substantially as set forth.

2. In a saw-set, the oppositely-beveled base, a base-plate secured to one face of said base and provided with an anvil, a spring-die working upon said base over the anvil, an eccentric lever pivoted upon the base over said die, a transverse rest-plate located in front of the base-plate and the anvil thereon, a gage-screw, and an adjustable retaining-lever adjustably mounted upon said base-plate and projecting over the rest-plate and adjacent to the gage-screw, substantially as set forth.

3. In a saw-set, the combination, with the base-plate, setting devices mounted upon said plate, a transverse rest-plate, and an adjacent gage-screw, of a retaining-lever centrally pivoted over the base-plate and provided with a forwardly-extending retaining-arm projecting over the rest-plate over one side of the gage-screw, and an opposite threaded end, and an adjusting-screw engaging said threaded end and bearing upon the base-plate, substantially as set forth.

In testimony that I claim the foregoing as my own I have hereto affixed my signature in the presence of two witnesses.

CLARK BAKER.

Witnesses:
B. D. LECKLIDER,
E. LAWRENCE.